United States Patent [19]
Cardot et al.

[11] Patent Number: 4,823,383
[45] Date of Patent: Apr. 18, 1989

[54] PROTECTION DEVICE FOR TERMINAL EQUIPMENT ON TELEPHONE SUBSCRIBER PREMISES

[75] Inventors: Gérard Cardot, Lachapelle Saint Pierre; Giovanni Dortu, Montigny, both of France

[73] Assignee: Telic Alcatel, Paris, France

[21] Appl. No.: 121,833

[22] Filed: Nov. 17, 1987

[30] Foreign Application Priority Data

Nov. 17, 1986 [FR] France ................. 86 15950

[51] Int. Cl.$^4$ ............ H04M 1/00; H03H 7/09; H02H 9/00
[52] U.S. Cl. .................. 379/412; 361/119; 361/56; 333/177
[58] Field of Search ........... 333/177, 168, 175, 176, 333/167, 12, 181, ; 361/56, 91, 119; 379/399, 412, 413, 414, 415, 416, 417; 455/307; 328/167

[56] References Cited

U.S. PATENT DOCUMENTS 4,191,985  3/1980  Phillips .
4,584,622  4/1986  Crosby et al. .
4,586,104  4/1986  Standler ................. 361/91
4,667,173  5/1987  Okochi ................... 333/177
4,761,623  8/1988  Schneider .............. 333/177 X

FOREIGN PATENT DOCUMENTS 2022553  11/1971  Fed. Rep. of Germany ........ 361/56
3400899  8/1984   Fed. Rep. of Germany .
8203733  10/1982  PCT Int'l Appl. .
8500473  1/1985   PCT Int'l Appl. .

OTHER PUBLICATIONS

"Power Line Filter," S. J. Sekhri, IBM Technical Disclosure Bulletin, vol. 17, No. 7, Dec. 1974, pp. 1998-1999.

Primary Examiner—Jin F. Ng
Assistant Examiner—Randall S. Vaas
Attorney, Agent, or Firm—Sughrue, Mion, Zinn, Macpeak & Seas

[57] ABSTRACT

The protection device in accordance with the invention is connected in series with the line. It comprises either a circuit (1) for providing protection against voltage surges, or else a filter (2) for providing protection against radio frequencies, or else both said circuit and said filter. It protects terminal equipment (telephone set, data terminal, fascimile machine, etc.) against disturbances both in differential mode and in common mode. The device is mounted in a protection connector which may either be of the wall socket type or else of the removable adapter type for plugging into a conventional wall socket, and in either case the terminal equipment has a plug which plugs into a corresponding socket of the protection connector.

2 Claims, 2 Drawing Sheets

PROTECTION DEVICE FOR TERMINAL EQUIPMENT ON TELEPHONE SUBSCRIBER PREMISES

FIELD OF THE INVENTION

The invention relates to providing protection on subscriber premises for subscriber terminal equipment connected to a telephone line, with the protection relating to radio frequencies and interference, and/or to voltage surges conveyed along the line to the subscriber terminal equipment. The term "subscriber terminal equipment" covers not only a telephone set, but also any other apparatus connected to a telephone line, for example a facsimile machine or apparatus for interrogating a data bank.

BACKGROUND OF THE INVENTION

It is well known that in some geographical locations the operation of terminal equipment connected to a telephone line can be disturbed by radio emissions or by electrostatic discharges.

Further, although protection devices for providing protection against voltage surges are generally provided at telephone exchanges, devices for providing such protection against voltage surges (which are usually caused by lightning) are not generally provided on subscriber premises.

An aim of the invention is to protect a subscriber against disturbances due to radio frequencies.

Another aim of the invention is to protect a subscriber against voltage surges. Naturally both types of protection may optionally be provided simultaneously.

Another aim of the invention is to make a device available for a subscriber seeking protection, which device is compact, very simple to use, and does not require any modification to the terminal equipment(s) to be protected.

SUMMARY OF THE INVENTION

The invention provides a protection device for terminal equipment on telephones in subscriber premises, for providing protection against radio frequencies and interference conveyed by a telephone line, the device being characterized by the fact that it is constituted by a filter in series with the telephone line, said filter comprising, in series between a first input terminal and a first output terminal: first, second, third, and fourth inductors; and in series between a second input terminal and a second output terminal, fifth, sixth, seventh, and eighth inductors; in that the first, second, fifth, and sixth inductors have the same inductance; in that the first and fifth inductors share a common magnetic circuit; in that the second and the sixth inductors share a common magnetic circuit; in that the third and the seventh inductors have the same inductance and different magnetic circuits; in that the fourth and the eighth inductors have the same inductance and a common magnetic circuit; in that a first point common to the first and second inductors is connected by a first capacitor to ground; in that a second point common to the fifth and the sixth inductors is connected by a second capacitor to ground; in that a third point common to the second and third inductors is connected via a third capacitor to ground; in that a fourth point common to the sixth and seventh inductors is connected by a fourth capacitor to ground; in that the third and fifth points are interconnected by a fifth capacitor; and in that the first, second, third, and fourth capacitors have the same capacitance.

The invention also provides a protection device for terminal equipment on telephone subscriber premises, for providing protection against surge voltages conveyed by a telephone line, the device being characterized by the fact that it comprises: a first thermistor between a first input terminal and a first output terminal; a second thermistor between a second input terminal and a second output terminal; a first voltage limiter between the output terminals; a second voltage limiter between the first output terminal and ground; and a third voltage limiter between the second output terminal and said ground.

BRIEF DESCRIPTION OF THE DRAWINGS

Embodiments of the invention are described by way of example with reference to the accompanying drawings, in which.

MORE DETAILED DESCRIPTION

Figure 1:
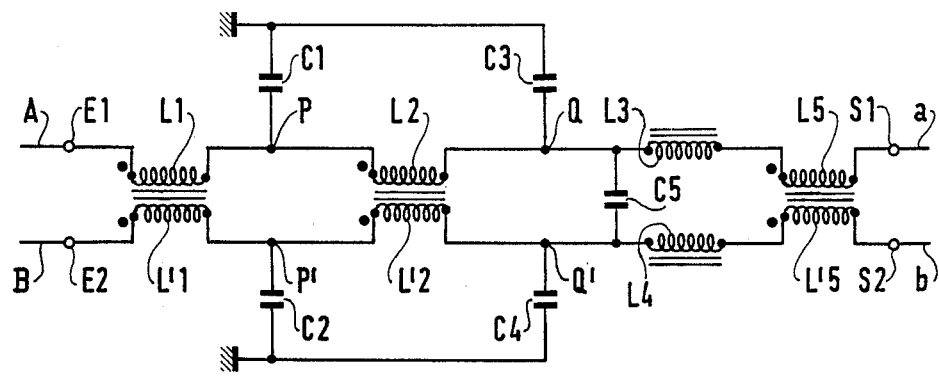
FIG. 1 shows a filter in accordance with the invention for providing protection against radio frequencies and interference.

FIG. 1 is a diagram of a filter for providing protection against radio frequencies and interference. It has two input terminals E1 and E2 which are connected to the A and B wires of a subscriber line and two output terminals S1 and S2 which are connected to the a and b wires of subscriber terminal equipment such as a telephone set. The terminals E1 and S1 are interconnected by inductors L1, L2, L3, and L5 connected in series and the terminals E2 and S2 are interconnected by inductors L'1, L'2, L4 and L'5 connected in series. The inductors L1 and L'1 have the same value and a common magnetic circuit, the inductors L2 and L'2 have the same value and a common magnetic circuit, and the inductance of these inductors is the same as the inductance of the inductors L1 and L'1. The inductors L3 and L4 have the same inductance and different magnetic circuits; the inductors L5 and L'5 have the same inductance and a common magnetic circuit. The magnetic circuits may be toruses, for example. A point P common to the inductors L1 and L2 is connected to ground via a capacitor C1, and a point P' common to inductors L'1 and L'2 is connected to ground via a capacitor C2. A point Q common to inductors L2 and L3 is connected to ground via a capacitor C3, and a point Q' common to inductors L'2 and L4 is connected to ground via a capacitor C4. The values of the capacitors C1, C2, C3, and C4 are the same. The points Q and Q' are interconnected by a capacitor C5.

The filter is provided on a printed circuit and comprises three stages:

the first stage, which is a lowpass stage in differential mode, provides protection against common mode interference and is constituted by inductors L1, L'1, L2, and L'2, and by capacitors C1, C2, C3, and C4.

The conductors are connected to an equipotential constituted by a metal plane on one of the faces of the printed circuit, with said plane being optionally connected to earth in order to obtain better filtering of common mode interference;

a second stage for attenuating differential mode voltages outside the speech band, this second stage is constituted by the capacitor C5 and the inductors L3 and L4; and a third stage for attenuating residual common mode voltages, this third stage is constituted by the inductors L5 and L'5.

The inductors and capacitors may have the following values, for example:

$L1 = L'1 = L2 = L'2 = 18$ millihenrys
$L3 = L4 = 220$ microhenrys
$L5 = L'5 = 2.2$ millihenrys
$C1 = C2 = C3 = C4 = 2.2$ nanofarads
$C5 = 20$ nanofarads With these values, the filter gives more than 45 dB of attenuation from 100 kHz to 30 MHz, and at least 80 dB from 200 kHz to 10 MHz for common mode interference signals. For differential mode signals the filter inserts very low attenuation of about 1 dB in the speech band, and in particular in the band 0 kHz to 10 kHz, while giving more than 30 dB attenuation above 200 kHz.

Such a filter provides effective protection against radio frequencies and interference.

Figure 2:
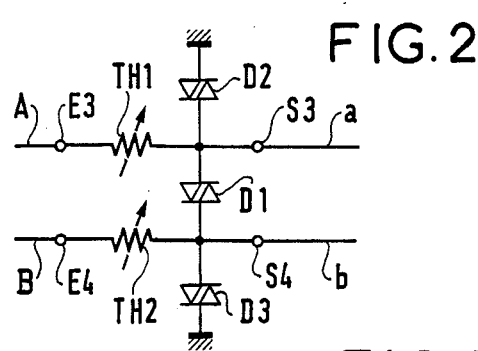
FIG. 2 shows a circuit in accordance with the invention for providing protection against voltage surges.

FIG. 2 is a diagram of a circuit for providing protection against voltage surges and comprises: a thermistor TH1 between an input terminal E3 and an output terminal S3; another thermistor TH2 between another input terminal E4 and another output terminal S4; a voltage limiter D1 between the two output terminals S3 and S4; a voltage limiter D2 between the output terminal S3 and ground; and a voltage limiter D3 between the output terminal S4 and ground. The thermistors TH1 and TH2 are identical and have a positive temperature coefficient. All three voltage limiters D1, D2, and D3 are identical and are each constituted, for example, by a pair of zener diodes connected head-to-tail. Naturally the limiters must be capable of passing ringing current so their operating voltage, i.e. the voltage at which they start clipping must be greater than the peak ringing signal voltage. This clipping voltage may be about 250 volts.

The input terminals E3 and E4 are connected to the subscriber line wires A and B, and the output terminals S3 and S4 are connected to wires a and b of terminal equipment such as a telephone set, for example.

The FIG. 2 protection circuit protects terminal equipment against high voltages on the line, both in differential mode and in common mode, with circuit ground being connected to the earth for this purpose.

Figure 3:
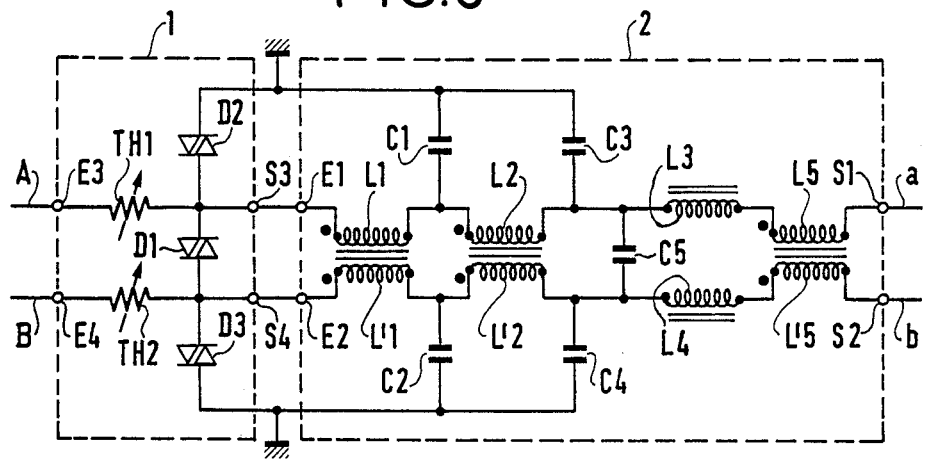
FIG. 3 shows a protection device in accordance with the invention providing protection against surges and against radio frequencies.

FIG. 3 is a diagram of a protection device in accordance with the invention for providing protection both against surges and against radio frequencies. To this end it is constituted by associating the FIG. 2 surge protection circuit with the FIG. 1 filter circuit.

The circuit 1 and the filter 2 are connected in series, with the output terminals S3 and S4 of the circuit 1 being connected to the input terminals E1 and E2 of the filter 2.

The circuit and the filter are mounted on a common printed circuit board having one face metallized to constitute ground both for the circuit 1 and for the filter 2.

The input terminals E3 and E4 of the circuit 1 are connected to the a and b wires of a subscriber line, and the output terminals S1 and S2 of the filter are connected to the a and b wires of terminal equipment such as a telephone set, for example.

A protection device in accordance with the circuits shown in FIGS. 1, 2, and 3 can be incorporated in a protection connector.

Terminal equipments on subscriber premises are generally removable, i.e. they have a male plug suitable for engaging in a female socket which is generally fixed to a wall.

Figure 4:
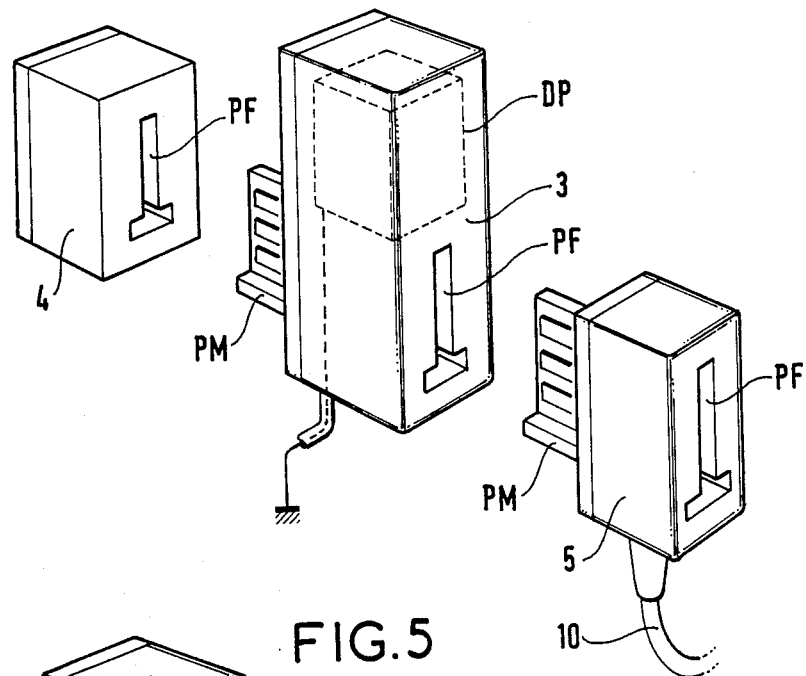
FIG. 4 shows a protection connector.
Figure 5:
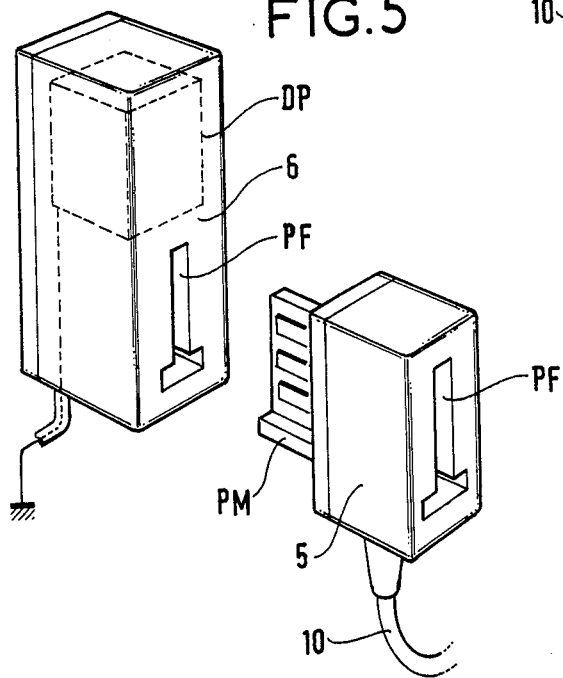
FIG. 5 shows a wall type protection connector.

FIGS. 4 and 5 show two embodiments of a protection connector.

FIG. 4 shows a conventional wall connector 4 fitted with a socket PF; a protection connector 3; and a terminal connector (fitted with a plug PM and with a socket PF) and connected by a cord 10 to terminal equipment. The protection connector 3 is an intermediate type connector and is fitted both with a plug PM and with a socket PF, and it includes a protection device DP.

The plugs and the sockets are connectors standardized by the telephone authorities. In the protection connector 3, the input terminals of the protection device are connected to the plug PM and the output terminals thereof are connected to the socket PF. The protection connector also includes an earthing terminal or wire connected to the ground of the protection device DP.

The protection device of FIG. 4 is thus mounted in a wall connector 4 and the terminal connector 5 plugs into the protection connector whose earth wire or terminal is connected to earth in order to provide effective protection against common mode voltages and/or radio frequency signals. This protection connector can thus be used on subscriber premises without making any modification to the existing installation (wall connector), or to the subscriber's terminal equipment(s).

FIG. 5 shows a protection connector 6 and a terminal connector 5 belonging to terminal equipment.

The protection connector 6 is of the wall type and is fixed to a wall instead of a conventional wall connector 5 as shown in FIG. 4. This protection connector thus does not include a plug but only has a socket PF. The ground of the protection device DP is connected either to a terminal of said protection connector or else to an earth wire which leaves said protection connector. The input terminals of the protection device are connected to the subscriber line and its output terminals are connected to the socket PF, with the earth terminal or wire being connected to earth. As in FIG. 4, the terminal connector 5 plugs into the socket of the protection connector.

The FIG. 5 protection connector can thus be used in any new installation instead of a conventional wall connector. It may also be used in an existing installation as a replacement for a conventional wall connector.

Naturally, the protection connector may include more than one socket, for example it may include two connectors for connections to a plurality of terminal equipments.

It may be observed that the protection device ground is not connected in the FIG. 4 embodiment to the plug PM of the protection connector. This is due solely to the fact that presently standardized plugs and sockets do not include a contact intended for connection to earth or to the ground of a circuit, but if plugs and sockets including a ground contact were to be standardized, the protection device ground would naturally be connected to the ground contact of the plug connector in the protection connector 3 and the earth contact of the socket in the wall connector 4 would be connected to earth.

Finally the protection connector may naturally be provided with plugs and sockets of a type other than that shown which correspond to the connectors that are standardized by the French telephone authorities.

We claim:

1. A protection device for terminal equipment on telephones in subscriber premises, for providing protection against radio frequencies and interference conveyed by a telephone line, the device being constituted by a filter in series with the telephone line, said filter comprising:

in series between a first input terminal and a first output terminal, first, second, third, and fourth inductors;

and in series between a second input terminal and a second output terminal, fifth, sixth, seventh, and eighth inductors;

the first, second, fifth, and sixth inductors having the same inductance;

the first and fifth inductors sharing a common magnetic circuit;

the second and the sixth inductors sharing a common magnetic circuit;

the third and the seventh inductors having the same inductance and different magnetic circuits;

the fourth and the eighth inductors having the same inductance and a common magnetic circuit;

a first point common to the first and second inductors being connected by a first capacitor to ground;

a second point common to the fifth and the sixth inductors being connected by a second capacitor to ground;

a third point common to the second and third inductors being connected via a third capacitor to ground;

a fourth point common to the sixth and seventh inductors being connected by a fourth capacitor to ground;

the third and fourth points being interconnected by a fifth capacitor; and the first, second, third, and fourth capacitors having the same capacitance.

2. A protection device for terminal equipment on telephone subscriber premises, for providing protection against external disturbances conveyed by a telephone line, the device comprising in series with the telephone line both a circuit for providing protection against voltage surges and a filter for providing protection against radio frequencies, said circuit and filter having a common ground; said circuit for providing protection against voltage surges comprising:

a first thermistor between a first input terminal and a first output terminal;

a second thermistor between a second input terminal and a second output terminal;

a first voltage limiter between the output terminals;

a second voltage limiter between the first output terminal and ground; and a third voltage limiter between the second output terminal and said ground;

said first and second input terminals being connected to the telephone line; and wherein said filter for providing protection against radio frequencies comprises:

in series between a third input terminal and a third output terminal, first, second, third, and fourth inductors;

and in series between a fourth input terminal and a fourth output terminal, fifth, sixth, seventh, and eighth inductors;

the third and fourth terminals being respectively connected to the first and second output terminals of the circuit for providing protection against voltage surges;

the first, second, fifth, and sixth inductors having the same inductance;

the first and fifth inductors sharing a common magnetic circuit;

the second and the sixth inductors sharing a common magnetic circuit;

the third and the seventh inductors having the same inductance and different magnetic circuits;

the fourth and the eighth inductors having the same inductance and a common magnetic circuit;

a first point common to the first and second inductors being connected by a first capacitor to ground;

a second point common to the fifth and the sixth inductors being connected by a second capacitor to ground;

a third point common to the second and third inductors being connected via a third capacitor to ground;

a fourth point common to the sixth and seventh inductors being connected by a fourth capacitor to ground;

the third and fourth points being interconnected by a fifth capacitor; and the first, second, third, and fourth capacitors having the same capacitance.

* * * * *